United States Patent [19]

Walton et al.

[11] 4,304,631

[45] Dec. 8, 1981

[54] CONTROL COMPONENT RETAINER

[75] Inventors: Lewis A. Walton; Raymond A. King, both of Lynchburg, Va.

[73] Assignee: The Babcock & Wilcox Company, New Orleans, La.

[21] Appl. No.: 53,862

[22] Filed: Jul. 2, 1979

[51] Int. Cl.³ .............................................. G21C 7/08
[52] U.S. Cl. .................................... 376/327; 376/364
[58] Field of Search ............... 176/36 C, 36 R, 50, 176/86 R

[56] References Cited

U.S. PATENT DOCUMENTS

| | | | |
|---|---|---|---|
| 3,377,252 | 4/1968 | Knights | 176/86 R |
| 3,382,153 | 5/1968 | Bigge et al. | 176/86 R |
| 3,580,805 | 5/1971 | Handel | 176/36 R |
| 3,779,134 | 12/1973 | Daublebsky et al. | 176/36 R |
| 3,853,699 | 12/1974 | Frisch et al. | 176/36 R |
| 3,888,732 | 6/1975 | Berglund et al. | 176/50 |
| 4,030,973 | 6/1977 | Hoffmeister et al. | 176/36 R |
| 4,134,789 | 1/1979 | Aubert | 176/30 |
| 4,181,569 | 1/1980 | Ingham | 176/36 R |

*Primary Examiner*—Sal Cangialosi
*Attorney, Agent, or Firm*—D. Anthony Gregory; Robert J. Edwards

[57] ABSTRACT

A retainer to provide supplemental holddown force for a control component assembly latched into a fuel assembly of a nuclear reactor. Upon failure of latching mechanism the retainer precludes the ejection of the control component assembly from the fuel assembly by the upward coolant flow drage force. The spring loaded retainer is mounted at the top of the control component assembly and engages both the control component assembly and the core grid plate to form a structural blocking of the grid plate hole thereby precluding the ejection of the control component assembly therethrough.

6 Claims, 3 Drawing Figures

CONTROL COMPONENT RETAINER

BACKGROUND

The present invention relates to control components for a nuclear reactor and, more particularly, to a retainer to provide supplemental holddown force for undriven control components to preclude lifting of the component from the core by coolant flow.

Typically, a nuclear reactor for the generation of electrical power includes a core of fissionable material to heat a coolant flowing therethrough. The fissionable material is enclosed in elongated fuel rods assembled in a square array commonly called fuel assemblies. The fuel assemblies are held in an array by core grid plates at the top and bottom.

A control component assembly, i.e., a plurality of interconnected rods containing neutron absorbing material, disposed in guide tubes within a fuel assembly, is provided to control the nuclear fission reaction rate of the fuel assembly. Each rod in the control component assembly is bolted to and suspended from a spider, i.e., a structure centrally disposed above the fuel assembly having radially extending arms. Some types of control components, commonly referred to as control rods, contain a strong neutron absorber such as Ag-In-Cd or $B_4C$ and are withdrawable from and insertable into the fuel assembly through the core grid plate, for starting and stopping, respectively, the nuclear fission chain reaction.

Another type of control component, commonly referred to as poison rods, contain weaker neutron absorbers such as $B_4C$ in an $Al_2O_3$ matrix. These rods usually are undriven and are not withdrawable. Rather, they are locked in position fully inserted in the fuel assemblies. Additional types of rods which are undriven and locked in position include: orifice plug rods, provided to preclude excess flow through guide tubes otherwise left open in fuel assemblies not requiring control component rods; and neutron source rods, orifice plug assemblies with at least one rod containing a source of neutrons provided for starting the reactor from total shutdown.

Locking control component assemblies into place in the fuel assembly is typically accomplished by a ball lock mechanism wherein the hub of the control rod assembly is insertable into a latch on the top of the fuel assembly and balls protruding from holes provided in the hub wall fit into a groove provided on the inside of the latch, thereby precluding the hub from being withdrawn from the latch. Typically in these types of locking mechanisms, the ball is not tight in the groove, thereby allowing some vertical movement of the control component assembly with respect to the fuel assembly.

It is necessary to allow considerable axial and lateral free play between the ball lock coupling mechanism and the latch in order to accommodate manufacturing dimensional tolerances, in service deformations and remote handling considerations. This free play, however, permits structural vibrations of the control component assembly to develop significant amplitude if unrestrained by some force. At low coolant flow velocities this is not a concern since the weight of the assembly is sufficient to hold it down on the top of the latch. In this condition, the locking balls do not even contact the latching groove due to the axial free play allowance. As the reactor flow is increased, however, the flow forces acting upward on the control component assembly increasingly counterbalance the downward force of gravity. Eventually, at a flow just below normal reactor full power conditions, the flow force exceeds the gravity force and the control component assembly lifts until its upward motion is limited when the locking balls contact the chamfered upper surface of the internal locking groove in the latch. In this nearly balanced condition the frictional forces available to resist relative motion between the control component assembly and the fuel assembly are very small. The turbulent high velocity coolant flow imparts significant driving energy into the hovering control component assembly and relatively large amplitude flow induced vibrations develop. Since the locking balls are now providing the limit to this motion the effect of this vibration is seen in a wearing away of the material on the upper chamfer of the locking groove.

On occasion, because of this flow induced vibration, latches of fuel assemblies in operating reactors have been worn to the extent that the locking mechanism has failed, resulting in ejecting of the control component assembly from the fuel assembly and damage to components of the reactor.

The present invention provides a supplemental holddown force to preclude lifting of the rods from the core. A retainer engages both the top of the control component assembly and the bottom of the core grid plate. Additional holddown force is provided by the weight of the retainer and by a compressed spring disposed between the portion of the retainer engaging the control component assembly and the portion of the retainer engaging the core grid plate. One important advantage of this retainer is that it may be installed on currently operating reactors without alteration of fuel assemblies, control component assemblies or reactor internal structures. The retainer includes a housing to fit over the control component hub. A bottom plate affixed to the housing has slots to engage nuts on the control component assembly or alternatively, to engage the arm of the control component spider, thereby precluding rotation or horizontal translation of the retainer. Disposed within the housing and around the hub are a coil spring and a slidable ring. One end of each of the arms of the retainer is affixed to the ring and the other end engages the core grid plate. The spring acts to, in effect, apply expansion force between the control component assembly and the core grid plate via the structure of the retainer thus providing holddown force for the control component assembly and minimizing latch wear.

It is an object of the invention to provide a retainer to preclude ejection of control component assemblies from nuclear reactors.

A further object of the invention is a retainer that may be field loaded on irradiated components presently in use in operating nuclear reactors.

Another object of the invention is a retainer having the foregoing advantages and being capable of applying additional holddown force on the control component assembly.

A further object of the invention is a retainer having the foregoing advantages and being installable without modification of the nuclear reactor.

Other objects and advantages of the present invention will be readily apparent from the following description and drawings which illustrate the preferred embodiments of the present invention.

SUMMARY OF THE INVENTION

The present invention involves a retainer for retaining a control component assembly disposed in and protruding from a fuel assembly in a nuclear reactor. The retainer includes a first engaging means to engage the control component assembly, a second engaging means to engage the core grid plate, and means to couple together the first and second engaging means thereby precluding the passage of the control component assembly through the core grid plate.

DESCRIPTION OF THE PREFERRED EMBODIMENTS

Figure 1:
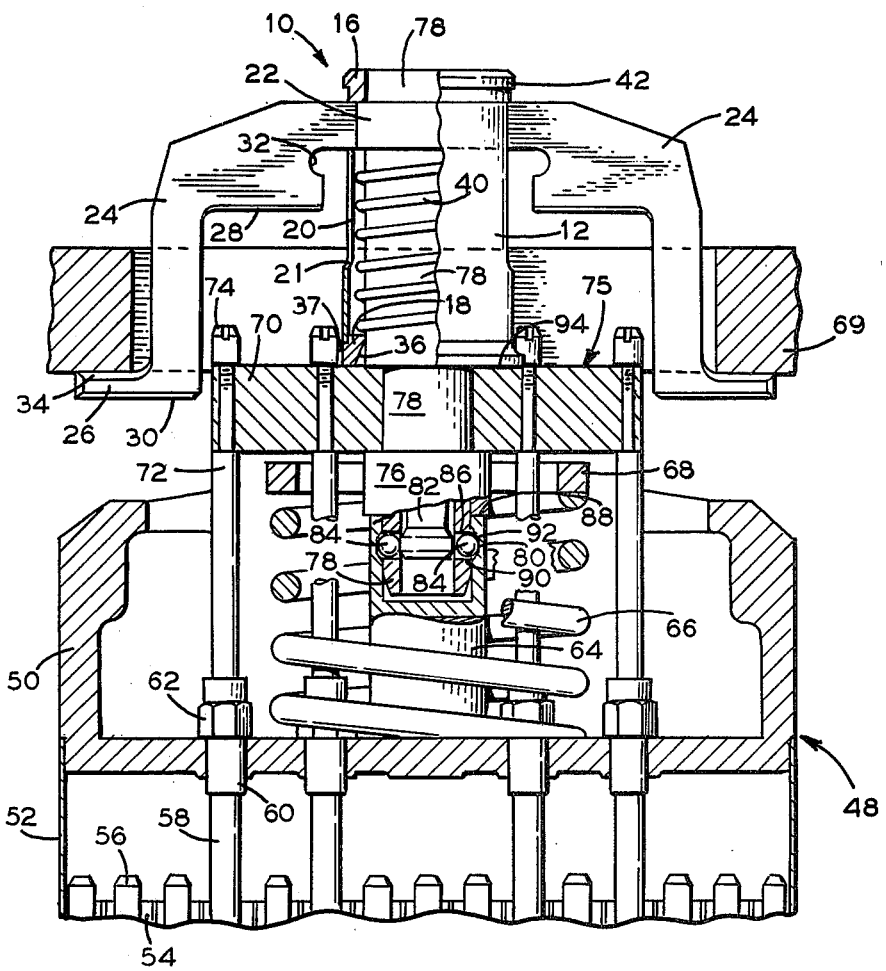
FIG. 1 is a partially sectioned view showing a retainer according to the invention in position on a control component assembly in a nuclear reactor.

Refer to FIG. 1 there being shown an embodiment of the retainer according to the invention positioned in the top of a fuel assembly of a nuclear reactor. In a fuel assembly 48, fuel pins 56, containing fuel pellets of fissionable material (not shown) and control rod guide tubes 58 are held in an array by spacer grid 54. Upper end fitting 50 is rigidly attached to spacer grid 54 via end grid skirt 52 being a flat plate running the circumference of and rigidly attached to grid 54 and fitting 50.

A plurality of control rod guide tubes 58, extend the length of the fuel assembly, through spacer grid 54 and through sleeves 60. Sleeves 60 and control rod guide tubes 58, disposed therein, extend through upper end fitting 50 and are secured thereto by nuts 62.

Control component rods 72 extend through guide tubes 58, through spider 70 and are secured thereto by nuts 74. Spider 70 is secured to hub 78 by collar 76 being fixedly attached to hub 78. Control component assembly 75, includes rods 72, spider 70, hub 78, collar 76, spring loaded plunger 82 and balls 84. Assembly 75 is neither inserted into nor withdrawn from the nuclear reactor during its operation. Rather, assembly 75 is locked in a fully inserted position by a ball lock coupling mechanism. FIG. 1 shows control component assembly 75 in the locked position. Hub 78 extends from above core grid plate 69, through the aperture in core grid plate 69, and suffers a reduction in diameter to extend through spider 70, through collar 76 and into latch 64 rigidly affixed to upper end fitting 50. Hub 78 is locked to latch 64 via balls 84 being simultaneously positioned in ball holes 86 of hub 78 and groove 80 of latch 64. Balls 84 are held in position by spring loaded plunger 82. The specific mechanics of unlocking and locking of the hub to the latch are not of importance to the invention and are not illustrated herein. The invention is equally applicable to any type locking mechanism whether or not of the ball locking type.

Typically control component assembly 75, rests on fuel assembly 48 held down only by gravity with collar 76 resting on latch 64 at plane 88. In operation of a nuclear reactor, water flows up around the fuel rods 56 and control rod guide tubes 58, through spacer grid 54, through upper end fitting 50, up through the annulus formed between control rod guide tubes 58 and rods 72 and up around spider 70 and hub 78. This flow of water exerts an upward drag force upon control component assembly 75 opposing the force of gravity. If the drag force becomes great enough to surpass the force of gravity, assembly 75 lifts until restrained by contact between hub 78 and balls 86 at points 90 and balls 86 and latch 64 at points 92 thereby being precluded from lifting any further. However, in the lifted condition, especially when the force of gravity is just overcome by the flow drag force, assembly 75 vibrates resulting in wear of latch 64 at points 92. This wear eventually may extend upward to plane 88 resulting in failure of the lock mechanism and the possible lifting of assembly 75 above core plate 69 to an extent which may cause damage to the nuclear reactor.

The present invention provides additional holddown force to an assembly 75 to supplement the force of gravity and structure to preclude assembly 75 from lifting above core plate 69 in the event of the above described failure of the locking mechanism.

Retainer, designated generally by reference numeral 10, includes housing 12, coil spring 40 and ring 22 disposed within housing 12 and retained therein by top plate 16 and bottom plate 18. Two diametrically opposed arms 24 rigidly attached to ring 22 extend radially outward through slots 20 of housing 12, extend further outward, then bend to extend longitudinally downward and then again bend to extend radially outward at foot-like projection 26.

Figure 3:
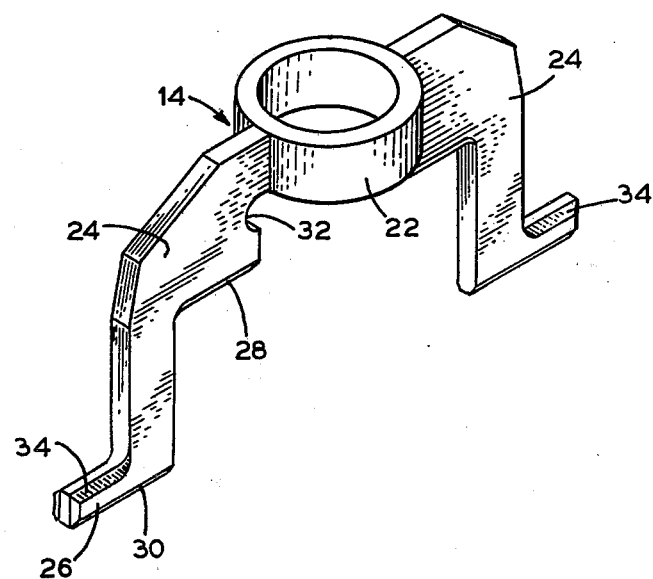
FIG. 3 is a perspective view showing the joined arms and ring of the retainer.

Refer now to FIG. 3 there being shown in perspective arms 24 and ring 22 of retainer 10. Arms 24 are tapered and notched to maximize structural strength. Rounded notch 32 eliminates a sharp corner, a potential stress failure point. These structural design aspects are well known to those ordinarily skilled in the art and are not further discussed herein.

Refer back to FIG. 1, top plate 16, ring 22, spring 40 and bottom plate 18 are apertured to fit around hub 78 extending therethrough. Bottom plate 18 rests upon spider 70 at plane 94.

Notches 37 of bottom plate 18 correspond to and engage nuts 74 thereby precluding rotation of retainer 10 with respect to assembly 75. Ring 22 is slidable within housing 12 and is urged against the bottom surface of top plate 16 by spring 40 being positioned between bottom plate 18 and ring 22.

Retainer 10 is placed in position over hub 78 of assembly 75 with core grid plate 69 removed. Core grid plate 69 fits over the core to align and secure fuel assemblies 48. Core grid plate 69 engages by means not shown, spring retainer 68 to compress spring 66 to hold down assembly 48. Members (not shown) extend down from plate 69 to engage fitting 50 at the outside surface thereof. In the arrangement in FIG. 1, breaks between members (not shown) occur above the four corners of the square array fuel assembly. Arm 24 is therefore positioned along the diagonal of the fuel assembly so that, upon positioning of core plate 69, foot 26 protrudes between members (not shown) and engages the lower surface of core plate 69.

Chamfers 30 and 28 are provided to reduce the magnitude of upward flow drag on retainer 10. Chamfer 34 is provided as a lead in surface for fitting between members (not shown) of grid plate 69. Chamfer 36 of bottom plate 18 is provided as a lead in surface to aid the positioning thereof over hub 78. Lip 42 is provided for installation and removal handling purposes.

In operation of the invention, a downward force is exerted on assembly 75 by retainer 10 equal to the weight of retainer 10 plus an expansion force exerted by spring 40 via bottom plate 18 as a result of compression of spring 40 by grid plate 69 via foot 26, arm 24 and ring 22. Any lifting of assembly 75 results in an additional holddown force thereon resulting from further compression of spring 40 proportional to the distance lifted and the spring constant of spring 40.

In the event of failure of the locking mechanism and lifting of assembly 75, housing 12 will slide up over ring 22 until arms 24 contact surface 21 of slot 20, whereby further lifting of assembly 75 is precluded.

Figure 2:
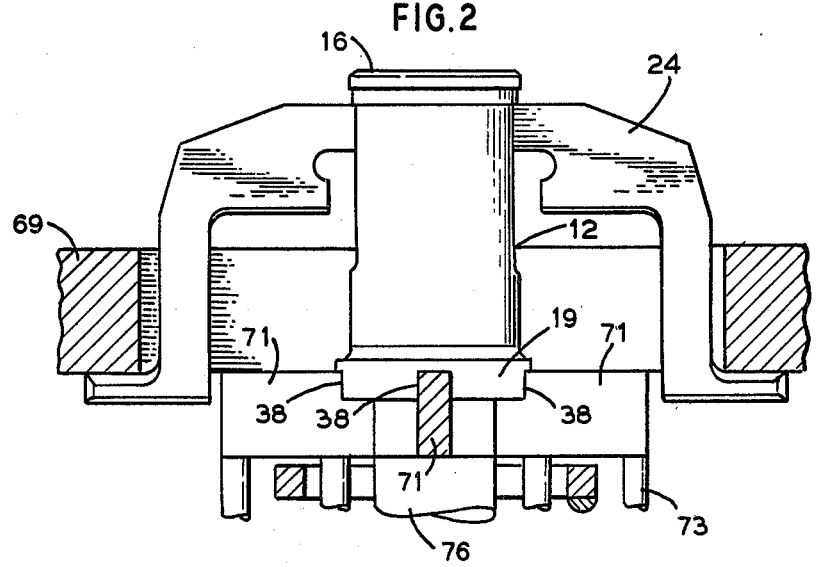
FIG. 2 is a partially sectioned view like FIG. 1 showing an alternate embodiment of the invention having a bottom plate engaging the spider arms.

Refer now to FIG. 2. Some types of control component assemblies, i.e., regenerative neutron source rod assemblies, have no nuts holding rods 73 to spider arms 71. Accordingly, bottom plate 19 has slots 38 to engage spider arms 71 thereby precluding rotation or horizontal translation of retainer 10.

The above described embodiments utilize cylindrical housing 12, ring 22 and spring 40 to fit cylindrical hub 78. The use of cylindrical structure is typical; however, the present invention is not limited thereto and any suitable shape may be utilized.

As above described the preferred embodiments of the retainer engage the core grid plate at its lower surface. This is only illustrative of the preferred embodiments and the invention is not thereby limited. Any suitable means to engage the core grid plate may be used within the spirit of the invention.

The above description and drawings are only illustrative of two embodiments with the objects, features and advantages of the present invention, and it is not intended that the present invention be limited thereto. Any modifications of the present invention coming within the spirit and scope of the following claims are considered part of the invention.

We claim:

1. An apparatus for retaining an undriven control component assembly disposed in a fuel assembly in a nuclear reactor of the type having a core grid plate comprising:

first engaging means for engaging the control component assembly said first engaging means including a housing;

second engaging means for engaging the core grid plate of the nuclear reactor, said second engaging means including a plurality of arms extending radially outward from said housing to below the core grid plate; and coupling means for coupling said first engaging means to said second engaging means thereby effectively engaging the control component assembly to the core grid plate to preclude the removal of the control component assembly from the fuel assembly, said coupling means including a ring slidably disposed in said housing, an upper plate affixed to the upper end of said housing to enclosure said ring therein, said housing having a plurality of longitudinal slots corresponding to said plurality of retainer arms, and said retainer arms protruding through said slots and being affixed to said ring.

2. A retainer as in claim 1 for retaining an undriven control component assembly of the type having control component rods extending through a spider and attached thereto by a nut wherein said first engaging means includes:

a lower plate affixed to the lower end of said housing, said lower plate being slotted to engage the nuts of the control component assembly thereby precluding rotation or horizontal translation of said housing.

3. A retainer as in claim 1 for retaining an undriven control component assembly of the type having control rods interconnected by a spider having a plurality of radially extending spider arms each having at least one rod hanging therefrom, wherein said first engaging means includes:

a lower plate affixed to the lower end of said housing; said lower plate being slotted to engage the arms of the spider thereby precluding rotation or horizontal translation of said housing.

4. A retainer as in claim 2 or claim 3 for retaining a control component assembly of the type having a vertically extending hub wherein:

said housing is elongated and hollow for accepting the protrusion of the hub therethrough; and said lower plate is apertured to accept the protrusion of the hub therethrough.

5. A retainer as in claim 4 wherein said coupling means includes:

said ring being apertured to accept the protrusion of the hub therethrough;

a spring disposed within said hub, below said ring and above said lower plate to exert an opposing force therebetween.

6. A retainer as in claim 6 for retaining an undriven control component assembly having a cylindrical hub wherein:

said housing is a hollow cylinder, capable of being concentrically disposed around the hub;

said lower plate sharing an axis of symmetry with said housing is a hollow cylinder capable of being concentrically disposed about said hub and having an inside diameter less than the inside diameter of said housing;

said lower plate being chamfered on its inner bottom edge to provide a lead in surface for positioning said retainer over the hub;

said upper plate is a hollow cylinder sharing and an axis of symmetry with said housing and capable of being concentrically disposed about the hub and having an inside diameter less than the inside diameter of said housing and being lipped to facilitate remote handling thereof;

said ring is a hollow cylinder sharing an axis of symmetry with said housing, capable of being concentrically disposed around the hub and concentrically disposed in said housing;

said spring is a coil spring sharing an axis of symmetry with said housing and capable of being concentrically disposed around the hub and concentrically disposed in said housing;

said retainer arms have chamfered lower edges thereby reducing flow drag force thereon; and said retainer arms have chamfered upper edges to provide a lead in surface for positioning the core grid plate over said retainer arms.

* * * * *